March 22, 1966     V. D. CLAIBORNE ETAL     3,241,948

ALUMINOUS METAL PARTICLES

Original Filed Aug. 8, 1958     4 Sheets-Sheet 1

INVENTORS
VERNON D. CLAIBORNE
LELAND R. PAYTON
by their attorneys
Glenn and Jackson March 22, 1966 V. D. CLAIBORNE ETAL 3,241,948
ALUMINOUS METAL PARTICLES
Original Filed Aug. 8, 1958 4 Sheets-Sheet 2

INVENTORS
VERNON D. CLAIBORNE
LELAND R. PAYTON
by their attorneys
Glenn and Jackson March 22, 1966  V. D. CLAIBORNE ETAL  3,241,948
ALUMINOUS METAL PARTICLES
Original Filed Aug. 8, 1958  4 Sheets-Sheet 4
Fig.6.A.  Fig.6.B.  Fig.6.C.  Fig.6.D.
Fig.6.E.  Fig.6.F.  Fig.6.G.
Fig.7.A.  Fig.7.B.  Fig.7.C.  Fig.7.D.
Fig.7.E.  Fig.7.F.  Fig.7.G.
INVENTORS
VERNON D. CLAIBORNE
LELAND R. PAYTON
by their attorneys
Glenn and Jackson United States Patent Office 3,241,948
Patented Mar. 22, 1966

3,241,948
ALUMINOUS METAL PARTICLES
Vernon D. Claiborne, Leawood, Kans., and Leland R. Payton, Richmond, Va., assignors to Reynolds Metals Company, Richmond, Va., a corporation of Delaware
Continuation of application Ser. No. 754,014, Aug. 8, 1958. This application Oct. 16, 1964, Ser. No. 404,530
1 Claim. (Cl. 75—.5)

This case in a continuation of the copending application 754,014 filed August 8, 1958, now abandoned. This case is also a continuation-in-part of application 728,584, now U.S. Patent No. 2,994,102.

This invention relates to aluminous metals in the novel form of acicular particles, and to the method of producing said particles. More particularly, the invention concerns a novel method of centrifugally casting aluminum and its alloys into small acicular particles.

The production of aluminum particles or powders has conventionally centered around three processes. The first and commercially most important is the process of atomizing fine powders by aspirating molten aluminum into a jet of air or steam under pressure, and blowing it out into a collecting chamber. These particles will all pass a screen of 100 mesh (U.S. Std. Sieve), and experience shows that such fine aluminum particles present a serious explosion hazard unless the collecting chamber is provided with expensive equipment to prevent an explosion. As a general rule, atomized powders will all pass 200 mesh, and are relatively gray looking in their original state. When they are to be used as pigments, they are ball milled to flatten them and thereby extend and brighten their surface areas. At the other extreme of particle size, aluminum shot of button-like dimension and shape (e.g., ⅜ inch diameter) is conventionally made by a process which comprises pouring molten aluminum through relatively large openings in a vibrating screen, and catching the droplets passing through the screen in a bath of water. While the atomized particles are generally spheroidal and easy to pour, the shot particles are usually disc-shaped or conically shaped, and relatively difficult to pour. As disclosed in the co-pending application Serial No. 728,584 (U.S. Patent No. 2,994,-102) filed April 15, 1958 by Leland R. Payton, one of the present applicants, improved shot of spheroidal shape can be made by centrifugal casting at limited rotational speeds, but such improved shot is in a size range which, although generally smaller than that of conventional shot, is still a great deal larger (down to a minimum of about 12 mesh) than that of conventional atomized powder (maximum of about 200 mesh). The third conventional process comprises stirring a body of molten aluminum until it breaks up into highly oxidized granules, which are usually of a size which passes 20 mesh and is retained on 60 mesh. The granules are very irregular, and are similar to atomized particles in that both have a relatively low apparent density. None of these processes produce aluminum particles which are relatively free of oxidation and are in a size range between the smallest shot and the largest atomized powder. Such intermediate range is needed in the chemical industry, for example, for selective control of reaction rates in making aluminum compounds.

We have discovered a process of high speed centrifugal casting of molten aluminum which produces the desired intermediate size range of aluminum particles. The particles are bright and have relatively small oxidized surface in proportion to their weight. These particles may range in size from less than about 5 mesh to more than about 100 mesh, with most of them ranging between about 10 mesh and 80 mesh. A valuable and significant characteristic of the new process is that the smallest particles can be made definitely larger than 100 mesh (e.g., retained in substantially all cases on 80 mesh), so that the explosion hazard and consequent expense of special collecting systems are eliminated.

The cast particles of the invention are characterized by an acicular, i.e., elongated or needle-like shape, which gives them an apparent density as high or higher than that of atomized powder, although it prevents them from pouring as readily as the grades of atomized powder which are selected for good pouring qualities. For example, the acicular cast particles of the invention have been found to have an apparent density of about 0.75 to 1.02 grams per cubic centimeter, while conventional atomized powder of 325 mesh has an apparent density of about 0.87 gram per cubic centimeter, as measured by the same method. It is a further advantage of the invention that the particle size distribution can be made quite narrow, and that there is a relatively great regularity and uniformity of shape of the particles, so that scrap and recycling losses are at a minimum. The equipment required is simple, especially as the particles are so fine that they quickly solidify in air and can be collected dry instead of being caught in a water bath, and a large amount of metal can be cast in a short time with a small expenditure of power and supervision. The high rotational speeds and consequent strong centrifugal forces overcome the resistance of the quickly formed aluminum oxide skin, and automatically prevent clogging of the outlets during casting.

The metallurgical qualities of the cast acicular particles are excellent, and it has been found that sheet rolled down from such particles has qualities equal to or better than that of sheet produced from like metal by conventional ingot casting and rolling techniques, which require much more capital investment and operating expense. The unusually good rolling qualities of the cast acicular particles are such that sintering of the green compact, according to conventional powder rolling techniques, can be eliminated when the acicular powders are preheated before rolling, with a further significant saving of expense.

The invention is applicable to pure aluminum, and also to alloys of aluminum containing more than 50% of aluminum. In some cases it is difficult to handle certain alloys because of the tendency of the constituents to separate during conventional casting. The sudden expulsion and solidification of the acicular cast particles of the invention provide a new means of producing such alloys in a useful form, such as aluminum-magnesium cast particles which can be admixed with oxidants to make high energy fuels.

For a better understanding of the invention and its other details, objects, and advantages, reference is now made to the present preferred embodiment of the invention which is shown, for purposes of illustration only, in the accompanying drawings. In the drawings:

FIGS. 5, 6A–G and 7A–G are photographic views of various species of acicular particles embodying the invention, described in Examples 5–7.

Figure 1:
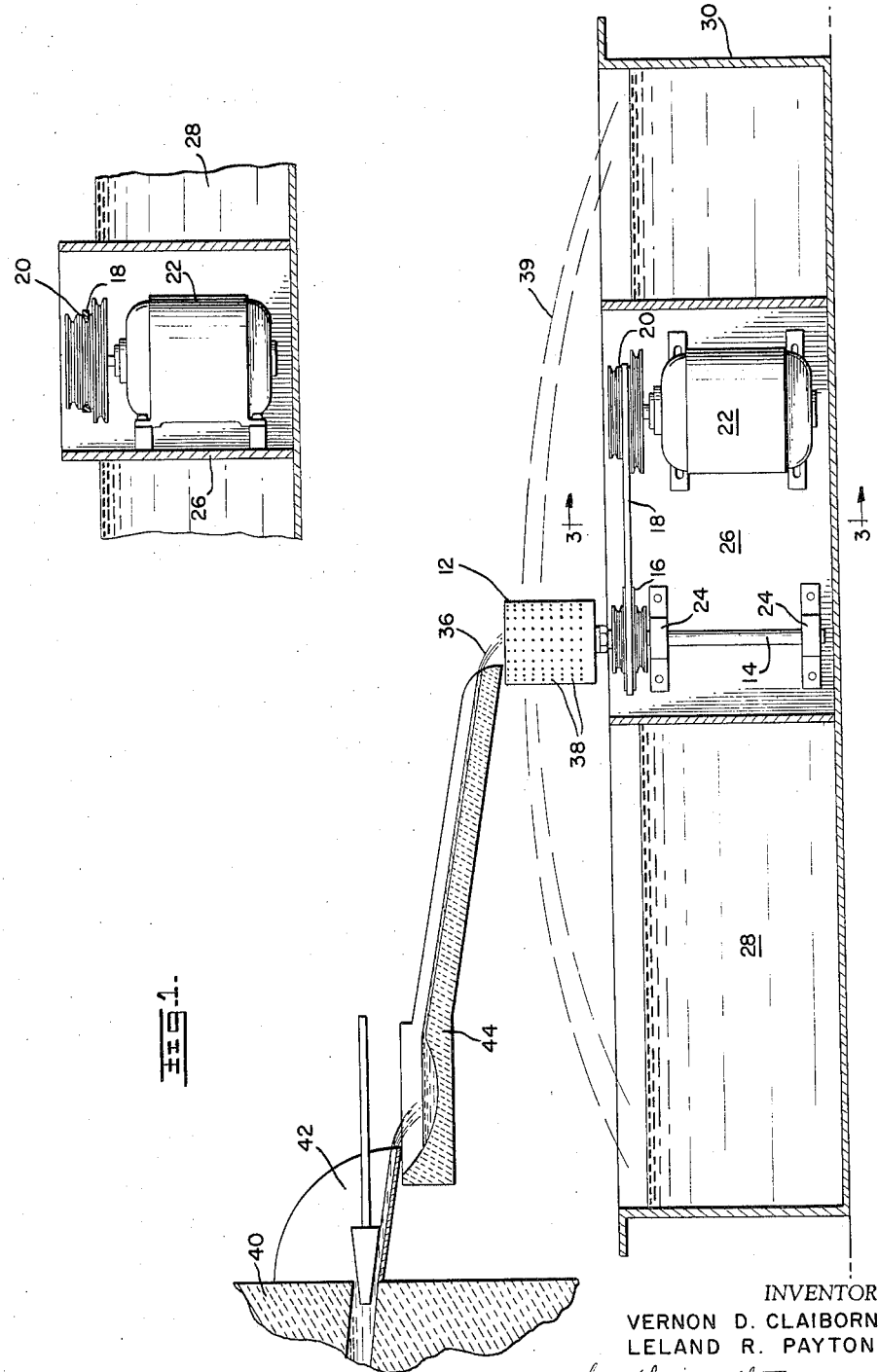
FIG. 1 is a vertical section through the center of casting apparatus embodying the invention.
Figure 2:
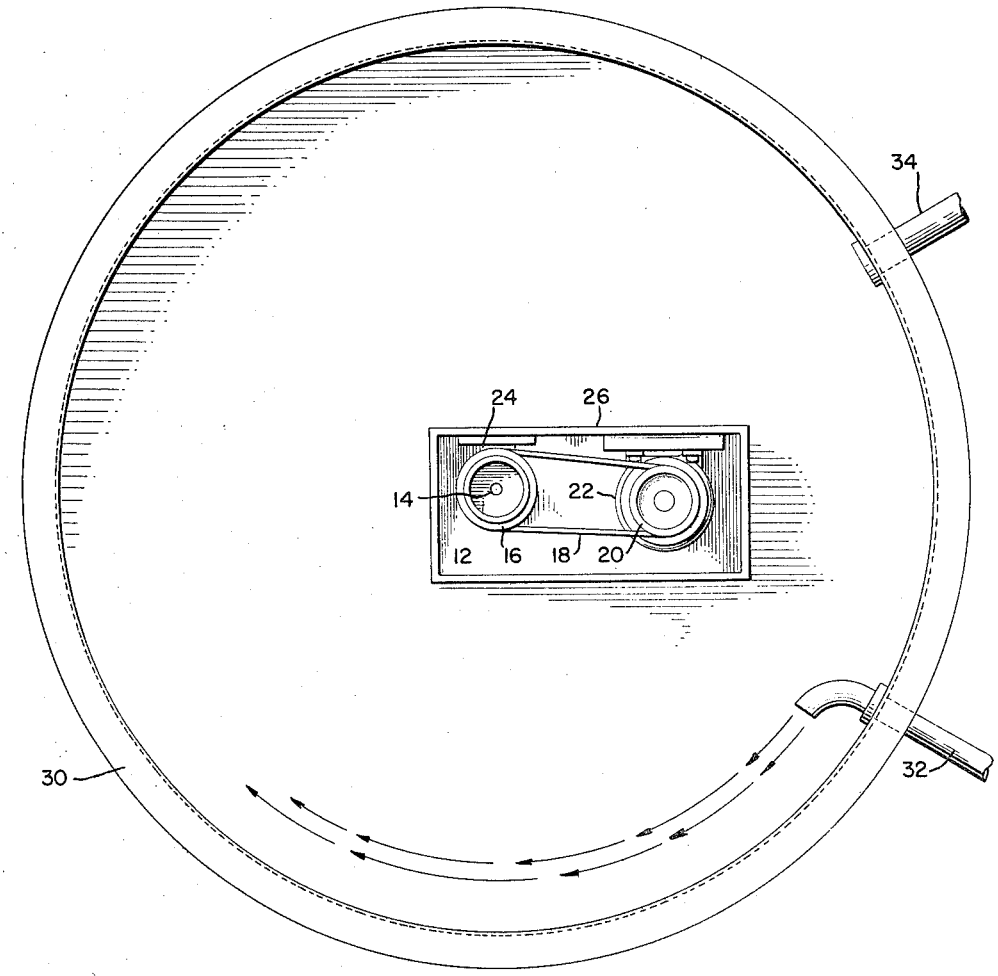
FIG. 2 is a top plan view of the apparatus shown in FIG. 1.
Figure 4:
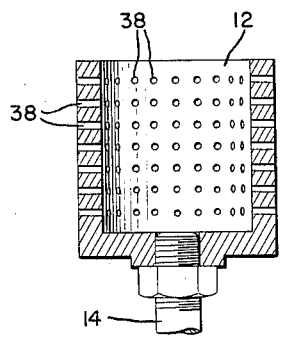
FIG. 4 is an enlarged and detailed sectional view of the casting pot shown in FIG. 1.
Figure 3:
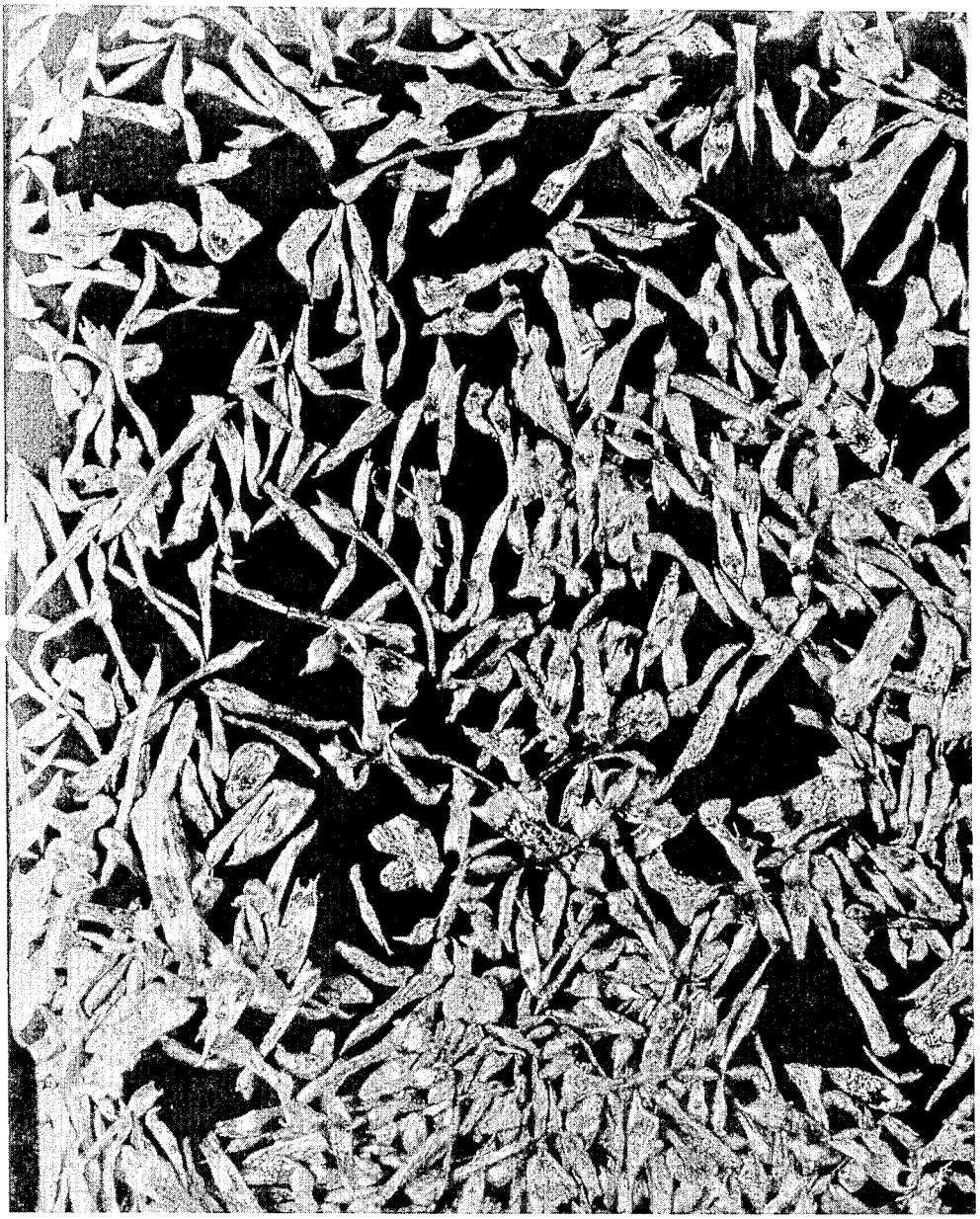
FIG. 3 is a section, partially broken away and enlarged, on the line III—III in FIG. 1.

Referring to FIGS. 1 and 2, the particle forming unit comprises centrifugal casting pot 12, which is mounted on vertical shaft 14, and is driven through pulley 16, belt 18 and pulley 20 from motor 22. The motor 22 and the brackets 24 of shaft 14 are mounted on supporting wall 26 which also acts as a protective enclosure in the middle of a body of water 28 in a tank 30.

Water is circulated into and out of tank 30 through its inlet pipe 32 and outlet pipe 34, in order to dissipate the heat from the particles cast from pot 12. However, the particles solidify in the air, and can be collected by other means, such as an air blower system, which would not involve catching them in a liquid bath.

As shown in more detail in FIG. 2, the centrifugal casting pot 12 is of cylindrical shape, having its upper end open to receive a stream of molten aluminum 36, and having radially extending apertures 38 in its side walls, through which the molten aluminum is expelled to cast acicular particles 39 into the surrounding air space. The solidified particles fall into the water 28. In order to obtain uniformity in particle size, driving motor 22 is preferably a constant speed motor, and the speeds for pot shaft 14 can be adjusted by changing the drive belts to use different ones of the pulleys 16 and 20, which offer different drive ratios.

The molten aluminum 36 is tapped from a melting furnace shown generally at 40, and flows down a discharge spout 42 into a conduit 44, and thence into the open upper end of the centrifugal pot 12. The pot is revolving at such speed as to cast the particles at least about 6 feet and rarely over about 12 feet radially from the pot (measured in terms of horizontal distance, when the drop is about one and a half to two feet to the catching surface, at which point the particles have cooled enough to be substantially solid).

The novel method of the present invention is applicable to a wide range of aluminous metals, including aluminum and aluminum-base alloys containing more than 50% aluminum. Of particular significance are alloys of aluminum and magnesium containing at least 65% aluminum by weight, such as alloys containing from 15 to 25% magnesium, because the particles of these alloys produced in accordance with the invention are ideal for admixture with oxidants to make propellants for rockets and other fuels.

The operation of the method and apparatus of the invention is shown in the following examples:

EXAMPLE 1

A 1500 pound charge of molten aluminum of 99% aluminum content was held in the melting furnace, and discharged into a hollow cylindrical casting pot made of cast iron having an outside diameter of 6 inches, a wall thickness of about ½ inch, and an inside height of about 8 inches, and provided with staggered rows of equally spaced apertures 0.052 inch in diameter, there being 27 such rows, each containing apertures spaced about ⅜ inch apart, around the periphery of the vertical wall of the pot. The pot was preheated to approximately the temperature of the furnace, namely about 1370° F. The pot was rotated at 2250 r.p.m. and molten aluminum was fed into it at a rate of about 3000 pounds per hour, at a temperature in the pot of 1320° F. The pot cast acicular aluminum particles represented by the following screen analysis:

|  | Percent |
|---|---|
| Held on 10 mesh | 1.2 |
| Through 10, held on 20 mesh | 16.2 |
| Through 20, held on 60 mesh | 82.1 |
| Through 60 mesh | 0.5 |

EXAMPLE 2

A charge of aluminum similar to that used in Example 1 was discharged at a temperature of 1345° F. into a hollow cylindrical casting pot made of steel, 3 inches in diameter, and 4 inches high, having ten rows of apertures of 0.052 inch diameter and on ⅜ inch centers in its vertical wall, and rotating at 3400 r.p.m. The screen analysis of the resulting acicular particles was:

|  | Percent |
|---|---|
| Held on 10 mesh | 0 |
| Through 10, held on 20 mesh | 16.50 |
| Through 20, held on 60 mesh | 82.38 |
| Through 60 mesh | 1.12 |

EXAMPLE 3

Repeating Example 2 with apertures of 0.125 inch diameter and a speed of 3450 r.p.m., the particles cast had the following screen analysis:

|  | Percent |
|---|---|
| Held on 10 mesh | 3.7 |
| Through 10, held on 20 mesh | 47.2 |
| Through 20, held on 60 mesh | 48.5 |
| Through 60 mesh | 0.6 |

It was noted that the particles were more uniform in appearance when caught on a dry instead of a wet surface, but the residual heat tended to make them stick together on the dry surface. A longer vertical air drop prevents such sticking.

EXAMPLE 4

A charge of molten aluminum similar to that of Example 1 was discharged from a furnace where it was held at 1330° F. into a cast iron hollow cylindrical casting pot 2¾ inches outside diameter and 4 inches high provided with apertures 0.086 inch in diameter, and revolving at 1720 r.p.m. The rate of discharge was about 1500 pounds per hour, the apertures being spaced ⅜ inch apart on centers in the same row and between rows. The screen analysis of the acicular particles obtained was:

|  | Percent |
|---|---|
| Held on 10 mesh | 9.3 |
| Through 10, held on 20 mesh | 39.5 |
| Through 20, held on 60 mesh | 51.2 |
| Through 60 mesh | 0.0 |

EXAMPLE 5

The pot of Example 2 was rotated at 8280 r.p.m. and fed with molten metal consisting of 7075 aluminum alloy (about 1.6% copper, 2.5% magnesium, 0.3% chromium, 5.6% zinc, balance substantially all aluminum), with an admixture of about 18% magnesium. The resultant particles were substantially all in the range between 20 and 80 mesh, and are shown in FIG. 5, at a magnification of about 10 and with lighting to show their bright surfaces. The casting temperature was about 1270° F.

EXAMPLE 6

99% aluminum metal was cast in the pot of Example 2 at 3943 r.p.m., and the particles had the following screen analysis:

|  | Percent |
|---|---|
| Held on 10 mesh (FIG. 6A) | Trace |
| Thorugh 10, held on 20 mesh (FIG. 6B) | 20.1 |
| Through 20, held on 30 mesh (FIG. 6C) | 41.9 |
| Through 30, held on 40 mesh (FIG. 6D) | 26.8 |
| Through 40, held on 50 mesh (FIG. 6E) | 9.8 |
| Through 50, held on 60 mesh (FIG. 6F) | 1.1 |
| Through 60 mesh (FIG. 6G) | 0.3 |

Samples of the screened particles are shown in the corresponding FIGS. 6A–G indicated above, at a magnification of about 2 and with silhouette lighting. The particles in fact had bright surfaces.

EXAMPLE 7

99% aluminum metal was cast in the pot of Example 2 at 2300 r.p.m., and the particles had the following screen analysis:

| | Percent |
|---|---|
| Held on 10 mesh (FIG. 7A) | 0.9 |
| Through 10, held on 20 mesh (FIG. 7B) | 23.4 |
| Through 20, held on 30 mesh (FIG. 7C) | 35.3 |
| Through 30, held on 40 mesh (FIG. 7D) | 34.0 |
| Through 40, held on 50 mesh (FIG. 7E) | 6.3 |
| Through 50, held on 60 mesh (FIG. 7F) | 0.06 |
| Through 60 mesh (FIG. 7G) | Trace |

Samples of these particles are shown in the corresponding FIGS. 7A–G indicated above, with the magnification and lighting of FIGS. 6A–G in Example 6.

EXAMPLE 8

Upon repeating Example 2 at 7400 r.p.m., none of the particles passed 100 mesh, and at 8280 r.p.m. a negligible fraction passed 100 mesh, which indicates that centrifugal force equal to that of a 3 inch diameter pot at about 8000 r.p.m. represents the safe upper limit of such force, with minor variations depending on casting temperatures. Beyond that, the percentage of particles 100 mesh increases, with a consequent increasing explosion hazard. At 10,000 r.p.m., for example, the same pot produces some particles passing 200 mesh. The particles remain acicular at the highest speeds. The throw from the pot never exceeds about 26 feet even at the highest speeds, because the harder the particles are thrown the finer they become, so that increasing air resistance overcomes their initial momentum.

In all of the above examples, a negligible proportion of bad particles, presumably from occasional overflow of the pot, were removed on an 8 mesh screen before making the screen analysis. All casting was through open air.

The pot openings are not considered critical, and have been found to work from about ⅛ inch to 0.040 inch diameter. In general, 0.052 inch has been found to be most satisfactory.

The temperature of the molten 99% aluminum metal should be close to and preferably within the range of about 1300 to about 1350° F. in order to minimize the number of misshapen particles at all pot speeds. Within that range, temperature variations have relatively little effect on the particles, except that increasing temperatures may make them cast faster. Other alloys require different temperatures. Above and below said range an increasing proportion of particles become lumps with tails on them, or are otherwise misshapen.

At the lower end of the pot speed range, which varies with the pot diameter in order to give like centrifugal forces, the particles become lumps with tails on them. Such a low limit is reached when the throw from the pot (measured horizontally when the vertical drop is about one and a half feet) is less than 6 feet. Preferably, to minimize the number of misshapen particles, the minimum throw should not be less than 8 feet. As explained above, there is no upper limit of speed in terms of throw, which does not exceed about 26 feet at the highest speeds, but there is an upper limit on speed (about 8000 r.p.m. for a 3 inch outside diameter pot, or corresponding speeds giving the same centrifugal force at the periphery of pots having other outside diameters) in terms of avoiding production of any apprecable number of particles passing 100 mesh, because of the resultant explosion hazard. Fine particles below 100 mesh could be cast from high speed pots by taking special precautions against explosions, and such particles, which remain acicular, have some special uses in chemical and other fields, since chemical reaction time, for example, is affected and can be controlled by particle size.

As used herein, the term "aluminous metal" refers to aluminum and alloys containing at least 50% of aluminum. The term "acicular particles" refers to elongated particles which may be curved or straight, but have a length along a central axis several times greater than their greatest thickness along their length. The centrifugally cast particles of the invention may range from passing about 8 mesh to holding on about 200 mesh, and in the preferred embodiments at least about 80% of the particles range from passing 20 mesh to holding on 60 mesh, with substantially no particles passing 100 mesh. The mesh numbers refer to the count of the equal number of each set of evenly spaced parallel fine wires intersecting each other at right angles in each square inch of the mesh, according to the recognized U.S. Standard Sieve system.

The fact that centrifugal force is proportional to the square of the angular velocity multiplied by the radius determines the corresponding speeds for different outside pot radii.

The particles of the invention have been found to yield substantially fully densified strip in one pass through a rolling mill, whether or not preheated, although preheating (e.g., to 900° F. in the case of 99% aluminum alloy) is important to avoid blistering when the rolled strip is annealed. For such rolling purposes, the whole range of particles can be used, but the ones passing 20 mesh and held on 60 mesh, with the distribution generally exemplified in Example 7, are preferred.

While present preferred examples of the method, apparatus and product of the invention have been given, it will be recognized that the invention is not limited thereto but may be otherwise variously embodied and practiced within the scope of the following claim.

We claim:

A free-flowing collection of solid elongated particles of aluminous metal, most of said particles having a cross-sectional area along the line of elongation which is greatest along the intermediate portion of said line and which diminishes toward both ends, the length of said particles along the line of elongation being only several times greater than the greatest thickness along said line, and said particles having a bright surface appearance with surface oxide thereon of relatively small weight in proportion to particle weight, having an as-cast metallurgical structure, and substantially ranging in size between about 10 mesh and 60 mesh, said particles being suitable for rolling in preheated condition directly into solid strip.

References Cited by the Examiner

UNITED STATES PATENTS 2,211,775   8/1940   Haunz.

DAVID L. RECK, *Primary Examiner.*